US011643527B2

(12) United States Patent
Kobayashi et al.

(10) Patent No.: US 11,643,527 B2
(45) Date of Patent: May 9, 2023

(54) TRANSMISSION BELT

(71) Applicant: BANDO CHEMICAL INDUSTRIES, LTD., Kobe (JP)

(72) Inventors: Shogo Kobayashi, Kobe (JP); Hideyuki Kato, Kobe (JP); Takafumi Masuda, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/543,613

(22) Filed: Dec. 6, 2021

(65) Prior Publication Data

US 2022/0089845 A1    Mar. 24, 2022

Related U.S. Application Data

(63) Continuation of application No. PCT/JP2020/018377, filed on May 1, 2020.

(30) Foreign Application Priority Data

Jun. 7, 2019 (JP) .............................. JP2019-107206

(51) Int. Cl.
*C08L 11/00* (2006.01)
*F16G 5/04* (2006.01)
*F16G 5/08* (2006.01)
*F16G 5/20* (2006.01)

(52) U.S. Cl.
CPC ............... *C08L 11/00* (2013.01); *F16G 5/04* (2013.01); *C08L 2205/03* (2013.01); *C08L 2205/16* (2013.01); *F16G 5/08* (2013.01); *F16G 5/20* (2013.01)

(58) Field of Classification Search
CPC .................................................. F16G 5/04–08
See application file for complete search history.

(56) References Cited

U.S. PATENT DOCUMENTS

| 2003/0176539 | A1* | 9/2003 | Feuerborn ................. F16G 5/20 524/27 |
|---|---|---|---|
| 2014/0364260 | A1 | 12/2014 | Takahashi et al. |
| 2016/0010722 | A1 | 1/2016 | Kim et al. |
| 2016/0273616 | A1* | 9/2016 | Takehara ............. B29D 29/103 |
| 2018/0045273 | A1* | 2/2018 | Kobayashi ................ B32B 7/12 |
| 2018/0283495 | A1 | 10/2018 | Okubo et al. |
| 2020/0123350 | A1 | 4/2020 | Kobayashi et al. |
| 2020/0124135 | A1 | 4/2020 | Tsuchiya et al. |

FOREIGN PATENT DOCUMENTS

| CN | 103244605 A | 8/2013 |
|---|---|---|
| CN | 107531955 A | 1/2018 |
| JP | 2004-125012 A | 4/2004 |
| JP | 2015-031315 A | 2/2015 |
| JP | 2015-42903 A | 3/2015 |
| JP | 2016-205565 A | 12/2016 |
| JP | 2016-211589 A | 12/2016 |
| JP | 6427302 B1 | 11/2018 |
| JP | 6487124 B1 | 3/2019 |
| WO | 2013/124943 A1 | 8/2013 |
| WO | 2016/170788 A1 | 10/2016 |
| WO | 2017/094213 A1 | 6/2017 |

OTHER PUBLICATIONS

JP Office Action dated Jun. 30, 2020 as received in Application No. 2020-526642.
JP Decision to Grant dated Dec. 8, 2020 as received in Application No. 2020-526642.

\* cited by examiner

*Primary Examiner* — Ana L. Woodward
(74) *Attorney, Agent, or Firm* — Maschoff Brennan

(57) ABSTRACT

A power transmission belt includes a belt body at least portion of which is made of a rubber composition containing a rubber component, cellulose-based fine fibers, and cotton powder.

13 Claims, 3 Drawing Sheets

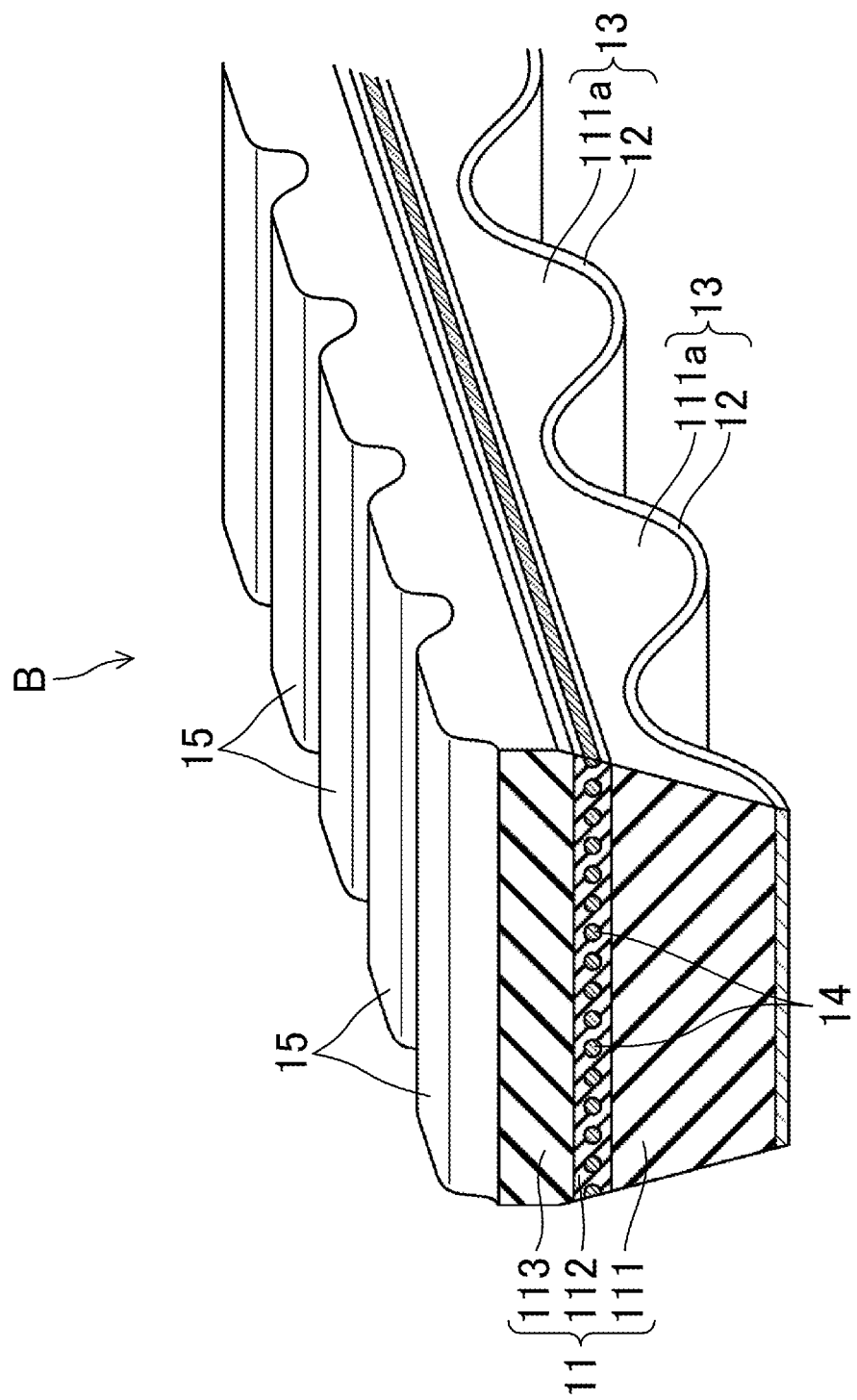

TRANSMISSION BELT

CROSS-REFERENCE TO RELATED APPLICATION

This is a continuation of International Application No. PCT/JP2020/18377 filed on May 1, 2020, which claims priority to Japanese Patent Application No. 2019-107206 filed on Jun. 7, 2019. The entire disclosures of these applications are incorporated by reference herein.

BACKGROUND

The present invention relates to a power transmission belt.

It has been known that a belt body of a power transmission belt is made of a rubber composition containing cellulose-based fine fibers and short fibers (e.g., Japanese Patent Nos. 6487124 and 6427302).

SUMMARY

The present invention is directed to a power transmission belt. The power transmission belt includes a belt body at least portion of which is made of a rubber composition containing a rubber component, cellulose-based fine fibers, and cotton powder.

BRIEF DESCRIPTION OF THE DRAWINGS

FIG. 1A is a perspective view of a piece of a double-cogged V-belt of an embodiment.

DESCRIPTION OF EMBODIMENT

An embodiment will be described in detail below.

Figure 1B:
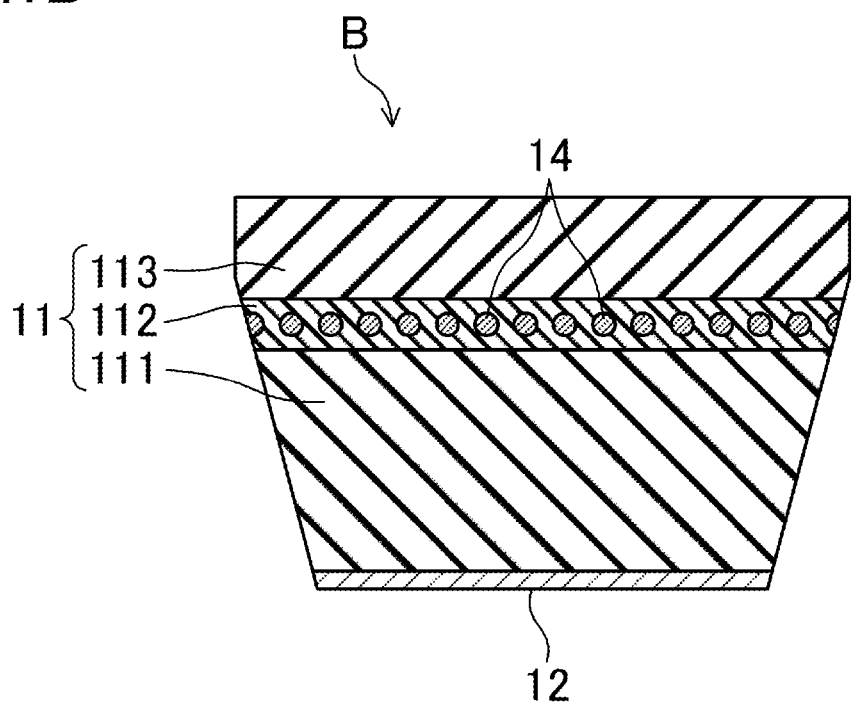
FIG. 1B is a cross-sectional view of the double-cogged V-belt of the embodiment in a belt width direction.
Figure 1C:
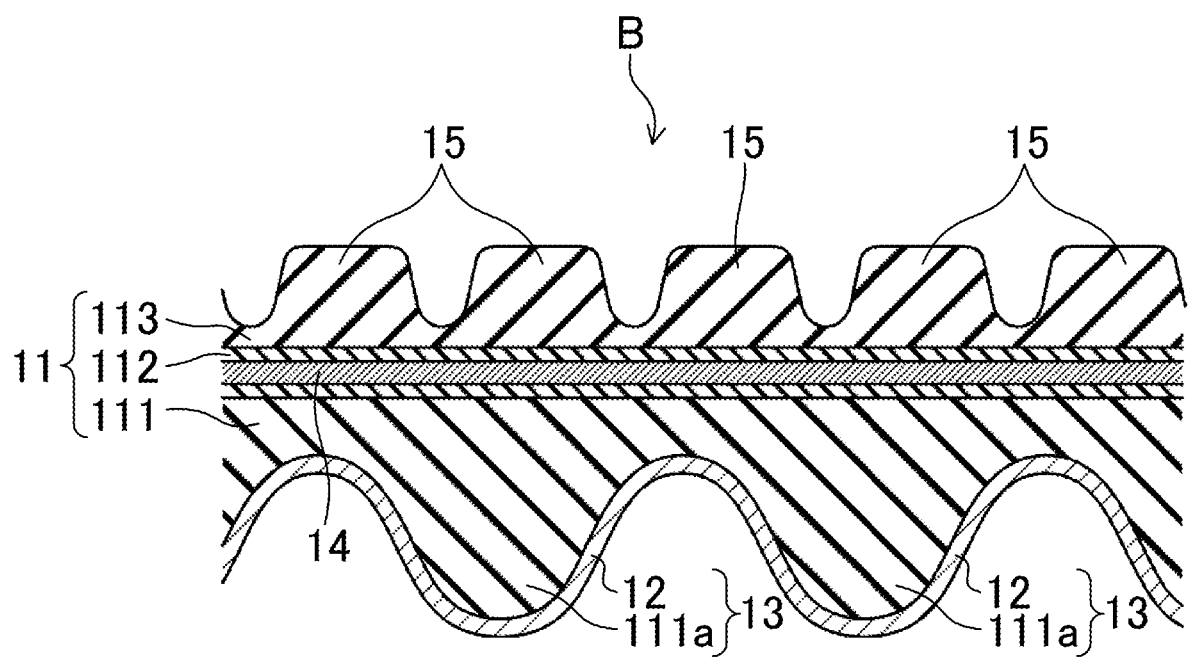
FIG. 1C is a cross-sectional view of the double-cogged V-belt of the embodiment in a belt length direction.

FIGS. 1A to 1C illustrate a double-cogged V-belt B (a power transmission belt) of an embodiment. The double-cogged V-belt B of the embodiment is, for example, a power transmission member used as a transmission belt in a transmission of a two-wheeled vehicle. The double-cogged V-belt B of the embodiment has a length of 500 mm or more to 1400 mm or less, a maximum width of 15 mm or more to 40 mm or less, and a maximum thickness of 7.0 mm or more to 18.0 mm or less, for example.

The double-cogged V-belt B of the embodiment includes an endless belt body 11 made of rubber. The belt body 11 is formed into a shape whose cross-sectional shape along a belt width direction is a combined and stacked shape of an isosceles trapezoid on an inner side of the belt and a horizontal rectangle on an outer side of the belt. Inclined surfaces of the belt body 11 on both sides thereof are formed as pulley contacting portions. The belt body 11 includes three layers of a compressed rubber layer 111 constituting the inner side of the belt, an adhesive rubber layer 112 as an intermediate portion in a belt thickness direction, and a stretch rubber layer 113 constituting the outer side of the belt. The inclined surfaces as the pulley contacting portions of the belt body 11 on both sides thereof include both side surfaces of the compressed rubber layer 111 and the adhesive rubber layer 112 and portions of both side surfaces of the stretch rubber layer 113 on the inner side of the belt.

The double-cogged V-belt B of the embodiment includes cover fabric 12 provided to cover the surface of the compressed rubber layer 111 on the inner side of the belt. The compressed rubber layer 111 includes, on its inner side, lower cog forming portions 111a at a constant pitch. The cross-sectional shape of each of the lower cog forming portions 111a along a belt length direction is a sine curve shape. The lower cog forming portions 111a are covered with the cover fabric 12 to form lower cogs 13. The double-cogged V-belt of the embodiment includes a cord 14 embedded in an intermediate portion of the adhesive rubber layer 112 in the belt thickness direction. The cord 14 is provided to extend in a circumferential direction to form a helical pattern with pitches in the belt width direction. The stretch rubber layer 113 includes, on its outer side, upper cogs 15 at a constant pitch. The cross-sectional shape of each of the upper cogs 15 along the belt length direction is a rectangular shape.

At least portion of the belt body 11, i.e., at least one of the compressed rubber layer 111, the adhesive rubber layer 112, or the stretch rubber layer 113 is made of a rubber composition A. The rubber composition A contains a rubber component, cellulose-based fine fibers, and cotton powder. The rubber composition A is obtained by heating and pressing an uncrosslinked rubber composition prepared by kneading the rubber component into which various rubber compound ingredients are blended in addition to the cellulose-based fine fibers and the cotton powder, and then crosslinking the kneaded product.

According to the double-cogged V-belt B of the embodiment, the rubber composition A forming at least portion of the belt body 11 in this manner contains the cotton powder in addition to the cellulose-based fine fibers, and therefore, a reinforcement effect provided by the cellulose-based fine fibers can be enhanced. The reason for this is assumed to be as follows. The cellulose-based fine fibers and the cotton powder are both cellulose-based materials and thus have an affinity with each other. A synergistic effect provided by physical entanglement and the like of the cellulose-based fine fibers and the cotton results in enhancement of dispersibility of the cellulose-based fine fibers as compared with a case where only the cellulose-based fine fibers are contained.

Particularly, the compressed rubber layer 111 forming a great portion of a pulley contact surface of each side surface of the belt body 11 is suitably made of the rubber composition A in terms of enhancing the strength against lateral pressure from a pulley by the reinforcement effect. When the belt is compressed and deformed in the belt width direction by the lateral pressure from the pulley, the contact pressure of the belt against the pulley decreases, whereby the belt easily slips on the pulley. However, if the strength against the lateral pressure from the pulley is high, compression deformation of the belt in the belt width direction is reduced, whereby the occurrence of the slip can be reduced. In terms of the same, the rubber composition A is suitably arranged such that a grain direction thereof corresponds to the belt width direction and a cross-grain direction thereof corresponds to the belt length direction.

Examples of the rubber component in the rubber composition A include: chloroprene rubber (CR); ethylene-α-olefin elastomer such as ethylene propylene copolymer (EPR), ethylene-propylene-diene terpolymer (EPDM), ethylene-octene copolymer, and ethylene-butene copolymer; chlorosulfonated polyethylene rubber (CSM); and hydrogenated acrylonitrile rubber (H-NBR). The rubber component is suitably one type of these rubbers or a rubber blend of two or more types of these rubbers, more suitably contains chloroprene rubber (CR), and much more suitably contains sulfur-modified chloroprene rubber (sulfur-modified CR) in terms of obtaining a high reinforcement effect by the cellulose-based fine fibers.

The cellulose-based fine fibers are contained and dispersed in the rubber component. The cellulose-based fine fibers are a fiber material derived from cellulose fine fibers made of a cytoskeleton component of a plant cell wall. The cytoskeleton component is obtained by untangling plant fibers. Examples of raw plants for the cellulose-based fine fibers include wood, bamboo, rice plants (rice straw), potato, sugarcane (bagasse), water plants, and seaweed. Among these raw plants, wood is suitable.

The cellulose-based fine fibers include cellulose fine fibers themselves and hydrophobized cellulose fine fibers obtained by hydrophobing the cellulose fine fibers. The cellulose-based fine fibers suitably contain one or both of these fibers.

The cellulose-based fine fibers include those manufactured by mechanically-defibrating means and having a high aspect ratio and those manufactured by chemically-defibrating means and having a needle crystal. The cellulose-based fine fibers suitably contain one or both of these fibers, more suitably contain cellulose-based fine fibers manufactured by mechanically-defibrating means in terms of obtaining a high reinforcement effect by the cellulose-based fine fibers.

The average fiber diameter of the cellulose-based fine fibers is, for example, 10 nm or more to 1000 nm or less. The average fiber length of the cellulose-based fine fibers is, for example, 0.1 μm or more to 1000 μm or less. The content of the cellulose-based fine fibers in the rubber composition A is suitably 0.1 parts by mass or more to 20 parts by mass or less, more suitably 1.5 parts by mass or more to 10 parts by mass or less, much more suitably 2 parts by mass or more to 5 parts by mass or less, relative to 100 parts by mass of the rubber component, in terms of obtaining a high reinforcement effect by the cellulose-based fine fibers.

The cotton powder is contained and dispersed in the rubber component. The cotton powder is recovered in such a manner that cotton cloth homogenate is sieved, for example. The fiber length of the cotton powder is suitably 500 μm or less, more suitably 250 μm or less, much more suitably 177 μm or less in terms of obtaining a high reinforcement effect by the cellulose-based fine fibers. The cotton powder having fiber lengths of 500 μm or less, 250 μm or less, and 177 μm or less is obtained using a 30-mesh (an aperture of 500 μm) sieve, a 60-mesh (an aperture of 250 μm) sieve, and a 80-mesh (an aperture of 177 μm) sieve, respectively. The average fiber diameter of the cotton powder is, for example, 5 μm or more to 20 μm or less.

The content of the cotton powder in the rubber composition A is suitably 0.1 parts by mass or more to 20 parts by mass or less, more suitably 1 part by mass or more to 15 parts by mass or less, much more suitably 2 parts by mass or more to 10 parts by mass or less, relative to 100 parts by mass of the rubber component, in terms of obtaining a high reinforcement effect by the cellulose-based fine fibers. In terms of the same, the content of the cotton powder in the rubber composition A is suitably equal to or greater than the content of the cellulose-based fine fibers. The ratio (the content of the cotton powder/the content of the cellulose-based fine fibers) of the content of the cotton powder to the content of the cellulose-based fine fibers in the rubber composition A is suitably 1.0 or more to 5.0 or less, more suitably 1.5 or more to 4.5 or less, much more suitably 2.5 or more to 3.5 or less in terms of the same. In terms of the same, the sum of the content of the cotton powder and the content of the cellulose-based fine fibers in the rubber composition A is suitably 5 parts by mass or more to 20 parts by mass or less, more suitably 7 parts by mass or more to 18 parts by mass or less, much more suitably 10 parts by mass or more to 15 parts by mass or less, relative to 100 parts by mass of the rubber component.

The rubber composition A may contain carbon black dispersed in the rubber component. Examples of the carbon black include: channel black; furnace black such as SAF, ISAF, N-339, HAF, N-351, MAF, FEF, SRF, GPF, ECF, and N-234; thermal black such as FT and MT; and acetylene black. The carbon black suitably contains one type or two or more types of these substances, more suitably contains carbon black having an arithmetic average particle diameter of 50 μm or less, much more suitably contains FEF, in terms of obtaining a high reinforcement effect.

The content of the carbon black in the rubber composition A is suitably 5 parts by mass or more to 30 parts by mass or less, more suitably 8 parts by mass or more to 20 parts by mass or less, much more suitably 10 parts by mass or more to 15 parts by mass or less, relative to 100 parts by mass of the rubber component, in terms of obtaining an effective reinforcement effect.

When the rubber composition A contains the carbon black, the content of the carbon black in the rubber composition A is suitably greater than the content of the cellulose-based fine fibers. The ratio (the content of the carbon black/the content of cellulose-based fine fibers) of the content of the carbon black to the content of the cellulose-based fine fibers in the rubber composition A is suitably 2.0 or more to 8.0 or less, more suitably 2.5 or more to 6.0 or less, much more suitably 3.0 or more to 5.0 or less.

When the rubber composition A contains the carbon black, the content of the carbon black in the rubber composition A is suitably greater than the content of the cotton powder. The ratio (the content of carbon black/the content of cotton powder) of the content of the carbon black to the content of the cotton powder in the rubber composition A is suitably 0.5 or more to 8.0 or less, more suitably 0.8 or more to 6.0 or less, much more suitably 1.0 or more to 2.0 or less.

When the rubber composition A contains the carbon black, the content of the carbon black in the rubber composition A is suitably equal to or greater than the sum of the content of the cellulose-based fine fibers and the content of the cotton powder. The ratio (the content of the carbon Black/the sum of the content of the cellulose-based fine fibers and the content of the cotton powder) of the content of the carbon black to the sum of the content of the cellulose-based fine fibers and the content of the cotton powder in the rubber composition A is suitably 1.0 or more to 5.0 or less, more suitably 1.0 or more to 3.0 or less, much more suitably 1.0 or more to 1.5 or less.

The rubber composition A may contain short fibers other than the cotton powder (hereinafter merely referred to as "short fibers") dispersed in the rubber component. The short fibers are suitably oriented in the belt width direction in terms of obtaining an effective reinforcement effect. The short fibers are subjected to adhesion treatment such as RFL treatment for imparting adhesion to the rubber.

Examples of the short fibers include para-aramid short fibers (polyparaphenylene terephthalamide short fibers, copolyparaphenylene-3,4'-oxydiphenylene terephthalamide short fibers), meta-aramid short fibers, nylon 66 short fibers, polyester short fibers, ultrahigh molecular weight polyolefin short fibers, polyparaphenylene benzobisoxazole short fibers, polyarylate short fibers, cotton, glass short fibers, and carbon short fibers. The short fibers suitably include one type or two or more types of these substances, and suitably include the para-aramid short fibers and more suitably include the copolyparaphenylene-3,4'-oxydiphenylene terephthalamide short fibers, in terms of obtaining a high reinforcement effect.

The fiber length of the short fibers is suitably 1 mm or more to 5 mm or less, more suitably 2 mm or more to 4 mm or less, in terms of obtaining an effective reinforcement effect. In terms of the same, the μm or more to 15 μm or less.

The content of the short fibers in the rubber composition A is suitably 3 parts by mass or more to 40 parts by mass or less, more suitably 5 parts by mass or more to 30 parts by mass or less, much more suitably 10 parts by mass or more to 20 parts by mass or less, relative to 100 parts by mass of the rubber component, in terms of obtaining an effective reinforcement effect.

When the rubber composition A contains the short fibers, the content of the short fibers in the rubber composition A is suitably greater than the content of the cellulose-based fine fibers. The ratio (the content of the short fibers/the content of the cellulose-based fine fibers) of the content of the short fibers to the content of the cellulose-based fine fibers in the rubber composition A is suitably 2.0 or more to 8.0 or less, more suitably 3.0 or more to 7.0 or less, much more suitably 4.0 or more to 6.0 or less.

When the rubber composition A contains the short fibers, the content of the short fibers in the rubber composition A is suitably greater than the content of the cotton powder. The ratio (the content of the short fibers/the content of the cotton powder) of the content of the short fibers to the content of the cotton powder in the rubber composition A is suitably 1.1 or more to 10 or less, more suitably 1.3 or more to 5.0 or less, much more suitably 1.5 or more to 2.0 or less.

When the rubber composition A contains the short fibers, the content of the short fibers in the rubber composition A is suitably greater than the sum of the content of the cellulose-based fine fibers and the content of the cotton powder. The ratio (the content of the short fibers/the sum of the content of the cellulose-based fine fibers and the content of the cotton powder) of the content of the short fibers to the sum of the content of the cellulose-based fine fibers and the content of the cotton powder in the rubber composition A is suitably 1.1 or more to 5.0 or less, more suitably 1.1 or more to 2.0 or less, much more suitably 1.2 or more to 1.5 or less.

The rubber composition A may contain, as other rubber compound ingredients, a plasticizer, a processing aid, an antioxidant, a crosslinking agent, a co-crosslinking agent, a vulcanization accelerator, a vulcanization accelerator aid, and the like.

The cover fabric 12 is made of woven fabric, knitted fabric, or unwoven fabric made of yarns of cotton, polyamide fibers, polyester fibers, or aramid fibers, for example. The cover fabric 12 is suitably subjected to adhesion treatment such as RFL treatment for providing adhesion to the compressed rubber layer 111 of the belt body 11.

The cord 14 is made of a twisted yarn of fibers, such as polyester fibers, polyethylene naphthalate fibers, aramid fibers, and vinylon fibers. The cord 14 is suitably subjected to adhesion treatment such as RFL treatment for providing adhesion to the adhesive rubber layer 112 of the belt body 11.

The double-cogged V-belt B of the embodiment can be manufactured by a known method which has been commonly used.

The double-cogged V-belt B has been described as a non-limiting example in the above embodiment, but the belt may be a single-cogged V-belt provided with lower cogs only on an inner side of the belt or a raw edge V-belt provided with no cogs. Further, the belt may also be other types of power transmission belts such as a flat belt, a toothed belt, a V-ribbed belt, and a wrapped V-belt.

The present embodiment has been described above for the configuration in which the cover fabric 12 covering the surface on the inner side of the belt is provided, but the present disclosure is not limited thereto. The belt may be configured to include cover fabric covering the surface on the outer side of the belt besides or instead of the cover fabric 12 covering the surface on the inner side of the belt, or to include no cover fabric covering the inner and outer sides of the belt may be employed.

EXAMPLES (Double-Cogged V-Belt)

Double-cogged V-belts of Examples 1 to 3 and Comparative Examples 1 to 3 below were produced. Compositions of each rubber composition forming a compressed rubber layer are also shown in Table 1.

Example 1

Kraft pulp was added to water such that the content of the kraft pulp reached 1% by mass, and the resultant mixture was preliminarily mixed with a stirrer and then charged into a micronizing device (Star Burst manufactured by Sugino Machine Limited). Subsequently, a process of pressurizing the mixture up to the 150 MPa and then causing the mixture to collide with a ceramic ball was repeated a total of eight times. In this manner, an aqueous dispersion of cellulose-based fine fibers manufactured by mechanically-defibrating means was prepared.

The aqueous dispersion of the cellulose-based fine fibers was mixed with sulfur-modified CR latex such that the content of the cellulose-based fine fibers reached 3 parts by mass relative to 100 parts by mass of sulfur-modified CR of a rubber component of the sulfur-modified CR latex, and the resultant mixture was air-dried and solidified.

A solid CR-cellulose-based fine fiber composite was charged into a rubber kneader and was kneaded. Then, 3 parts by mass of cotton powder (a fiber length of 250 μm or less), 20 parts by mass of carbon black (an FEF arithmetic average particle diameter: 43 μm), 5 parts by mass of a plasticizer (DOS), 1 part by mass of a processing aid (stearic acid), 2.3 parts by mass of an antioxidant, and 5 parts by mass of magnesium oxide relative to 100 parts by mass of the sulfur-modified CR as the rubber component were charged and kneaded. Thereafter, 5 parts by mass of zinc oxide and 16 parts by mass of RFL-treated para-aramid short fibers (copolyparaphenylene-3,4'-oxydiphenylene terephthalamide short fibers, a fiber length of 3 mm, a fiber diameter of 12 μm) were further charged and kneaded. In this manner, an uncrosslinked rubber composition was prepared.

A double-cogged V-belt having the same configuration as the above-described embodiment was produced, in which a compressed rubber layer was made of a rubber composition obtained by crosslinking the uncrosslinked rubber composition arranged such that a grain direction corresponds to a width direction and a cross-grain direction corresponds to a belt length direction. This double-cogged V-belt was used in Example 1.

An adhesive rubber layer and a stretch rubber layer were made of rubber compositions each containing sulfur-modified CR as a rubber component. As cover fabric, woven fabric of polyester fibers which had been subjected to RFL treatment and rubber cement treatment was used. As a cord, a twisted yarn of polyester fibers which had been subjected to RFL treatment and rubber cement treatment was used. The belt size was 800 mm in length, 24 mm in maximum width, and 10.0 mm in maximum thickness.

Example 2

A double-cogged V-belt having the same configuration as that of Example 1 was produced, except that the content of cotton powder in a rubber composition forming a compressed rubber layer was 6 parts by mass relative to 100 parts by mass of sulfur-modified CR of a rubber component and the content of carbon black was 16 parts by mass relative to 100 parts by mass of the sulfur-modified CR as the rubber component. This double-cogged V-belt was used in Example 2.

Example 3

A double-cogged V-belt having the same configuration as that of Example 1 was produced, except that the content of cotton powder in a rubber composition forming a compressed rubber layer was 9 parts by mass relative to 100 parts by mass of sulfur-modified CR of a rubber component and the content of carbon black was 12 parts by mass relative to 100 parts by mass of the sulfur-modified CR as the rubber component. This double-cogged V-belt was used in Example 3.

Comparative Example 1

A double-cogged V-belt having the same configuration as that of Example 1 was produced, except that the content of carbon black in a rubber composition forming a compressed rubber layer was 48 parts by mass relative to 100 parts by mass of sulfur-modified CR as the rubber component and no cellulose-based fine fibers and no cotton powder were contained. This double-cogged V-belt was used in Comparative Example 1.

Comparative Example 2

A double-cogged V-belt having the same configuration as that of Example 1 was produced, except that the content of carbon black in a rubber composition forming a compressed rubber layer was 24 parts by mass relative to 100 parts by mass of sulfur-modified CR as the rubber component and no cotton powder was contained. This double-cogged V-belt was used in Comparative Example 2.

Comparative Example 3

A double-cogged V-belt having the same configuration as that of Example 1 was produced, except that the content of carbon black in a rubber composition forming a compressed rubber layer was 44 parts by mass relative to 100 parts by mass of sulfur-modified CR as the rubber component and no cellulose-based fine fibers were contained. This double-cogged V-belt was used in Comparative Example 3.

TABLE 1

| | | Examples | | | Comparative Examples | | |
|---|---|---|---|---|---|---|---|
| | | 1 | 2 | 3 | 1 | 2 | 3 |
| Rubber Ingredients Parts by Mass | Rubber Component (Sulfur-Modified CR) | 100 | 100 | 100 | 100 | 100 | 100 |
| | Cellulose-Based Fine Fibers P | 3 | 3 | 3 | 0 | 3 | 0 |
| | Cotton Powder Q | 3 | 6 | 9 | 0 | 0 | 0 |
| | Carbon Black (FEF) R | 20 | 16 | 12 | 48 | 24 | 44 |
| | Para-Aramid Short Fibers S | 16 | 16 | 16 | 16 | 16 | 16 |
| | Plasticizer (DOS) | 5 | 5 | 5 | 5 | 5 | 5 |
| | Processing Aid (Stearic Acid) | 1 | 1 | 1 | 1 | 1 | 1 |
| | Antioxidant | 2.3 | 2.3 | 2.3 | 2.3 | 2.3 | 2.3 |
| | Co-Crosslinking Agent (Bismaleimide) | 5 | 5 | 5 | 5 | 5 | 5 |
| | Magnesium Oxide | 5 | 5 | 5 | 5 | 5 | 5 |
| | Zinc Oxide | 5 | 5 | 5 | 5 | 5 | 5 |
| | Q/P | 1.0 | 2.0 | 3.0 | — | — | — |
| | P + Q | 6 | 9 | 12 | — | — | — |
| | R/P | 6.7 | 5.3 | 4.0 | — | — | — |
| | R/Q | 6.7 | 2.7 | 1.3 | — | — | — |
| | R/(P + Q) | 3.3 | 1.8 | 1.0 | — | — | — |
| | S/P | 5.3 | 5.3 | 5.3 | — | — | — |
| | S/Q | 5.3 | 2.7 | 1.8 | — | — | — |
| | S/(P + Q) | 2.7 | 1.8 | 1.3 | — | — | — |

(Test Method)

Figure 2:
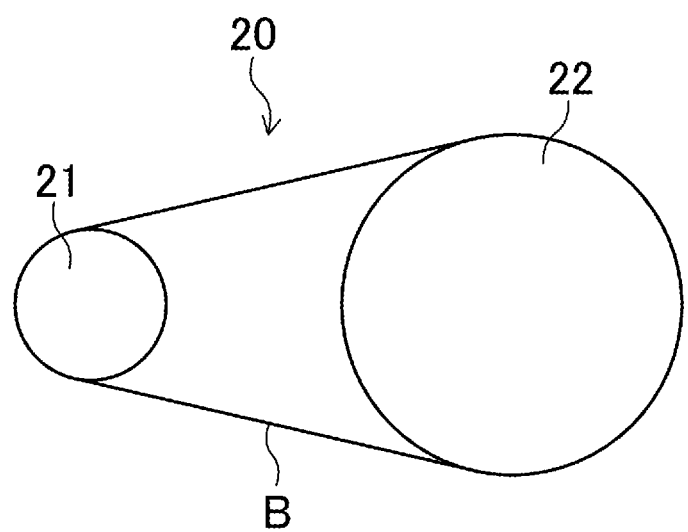
FIG. 2 shows a layout of pulleys of a belt running tester.

FIG. 2 illustrates the layout of pulleys of a belt running tester 20.

The belt running tester 20 includes a drive pulley 21 and a driven pulley 22 provided with a space in a right-left direction. The drive pulley 21 has a pulley diameter of 60 mm, and has a V-groove at the outer periphery thereof. The driven pulley 22 has a pulley diameter of 130 mm, and has a V-groove at the outer periphery thereof.

Each of the double-cogged V-belts B of Examples 1 to 3 and Comparative Examples 1 to 3 was wrapped around the drive pulley 21 and the driven pulley 22 so as to be fitted in V-grooves of the drive pulley 21 and the driven pulley 22. Then, under an ambient temperature of 80° C., a torque of 8 N·m was applied to a drive shaft to which the drive pulley 21 has been attached, and the drive pulley 21 was rotated to run the belt. The slip ratios were measured at the number of revolutions of the drive pulley 21 of 3000 rpm, 5000 rpm, and 7000 rpm. The average of these slip ratios was defined as an average slip ratio. The slip ratio was calculated based on the following expression where $N_{rO}$ was the number of revolutions of the drive pulley 21 under no load, $N_{rt}$ was the number of revolutions of the drive pulley 21 under load, $N_{nO}$ was the number of revolutions of the driven pulley 22 under no load, and $N_{nt}$ was the number of revolutions of the shaft of the driven pulley 22 under load.

Slip Ratio=$((I_0-I_t)/I_0) \times 100(\%)$ $(I_0=N_{nO}/N_{rO}, It=N_{nt}/N_{rt})$ (Test Results)

The test results are shown in Table 2. As can be seen from Table 2, Examples 1 to 3 where the rubber composition forming the compressed rubber layer contains the cellulose-based fine fibers and the cotton powder had lower average slip ratios as compared with Comparative Example 1 where both of the cellulose-based fine fibers and the cotton powder were not contained and Comparative Examples 2 and 3 where only one of the cellulose-based fine fibers or the cotton powder was contained.

TABLE 2

|  | Examples | | | Comparative Examples | | |
| --- | --- | --- | --- | --- | --- | --- |
|  | 1 | 2 | 3 | 1 | 2 | 3 |
| Average Slip Ratio (80° C.) % | 5.63 | 5.49 | 5.36 | 5.82 | 5.78 | 5.75 |

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A power transmission belt comprising:
a belt body at least a portion of which is made of a rubber composition containing a rubber component, cellulose-based fine fibers having an average fiber diameter of 10 nm or more to 1000 nm or less and an average fiber length of 0.1 μm or more to 1000 μm or less, cotton powder having an average fiber diameter of 5 μm or more to 20 μm or less and a fiber length of 250 μm or less, and carbon black, wherein
the content of the carbon black in the rubber composition is 5 parts by mass or more to 30 parts by mass or less relative to 100 parts by mass of the rubber component; and
the ratio of the content of the cotton powder to the content of the cellulose-based fine fibers in the rubber composition is 1.5 or more to 5.0 or less.

2. The power transmission belt of claim 1, wherein the rubber component includes chloroprene rubber.

3. The power transmission belt of claim 1, wherein the cellulose-based fine fibers include cellulose-based fine fibers formed by mechanically-defibrating means.

4. The power transmission belt of claim 1, wherein the content of the cellulose-based fine fibers in the rubber composition is 0.1 parts by mass or more to 20 parts by mass or less relative to 100 parts by mass of the rubber component.

5. The power transmission belt of claim 1, wherein the content of the cotton powder in the rubber composition is 0.1 parts by mass or more to 20 parts by mass or less relative to 100 parts by mass of the rubber component.

6. The power transmission belt of claim 1, wherein the sum of the content of the cotton powder and the content of the cellulose-based fine fibers in the rubber composition is 5 parts by mass or more to 20 parts by mass or less relative to 100 parts by mass of the rubber component.

7. The power transmission belt of claim 1, wherein the content of the carbon black in the rubber composition is greater than the content of the cellulose-based fine fibers in the rubber composition.

8. The power transmission belt of claim 7, wherein the ratio of the content of the carbon black to the content of the cellulose-based fine fibers in the rubber composition is 2.0 or more to 8.0 or less.

9. The power transmission belt of claim 1, wherein the content of the carbon black in the rubber composition is greater than the content of the cotton powder in the rubber composition.

10. The power transmission belt of claim 1, wherein the ratio of the content of the carbon black in the rubber composition to the content of the cotton powder in the rubber composition is 0.5 or more to 8.0 or less.

11. The power transmission belt of claim 1, wherein the content of the carbon black in the rubber composition is equal to or greater than a sum of the content of the cellulose-based fine fibers and the content of the cotton powder in the rubber composition.

12. The power transmission belt of claim 11, wherein the ratio of the content of the carbon black in the rubber composition to the sum of the content of the cellulose-based fine fibers and the content of the cotton powder is 1.0 or more to 5.0 or less.

13. A power transmission belt comprising:
a belt body at least a portion of which is made of a rubber composition containing a rubber component, cellulose-based fine fibers having an average fiber diameter of 10 nm or more to 1000 nm or less and an average fiber length of 0.1 μm or more to 1000 μm or less, cotton powder having an average fiber diameter of 5 μm or more to 20 μm or less and a fiber length of 250 μm or less, and carbon black,
wherein:
the content of the carbon black in the rubber composition is 5 parts by mass or more to 30 parts by mass or less relative to 100 parts by mass of the rubber component; and
the content of the cotton powder in the rubber composition is equal to or greater than a content of the cellulose-based fine fibers.

\* \* \* \* \*